United States Patent [19]

Hancock

[11] Patent Number: 5,184,921

[45] Date of Patent: Feb. 9, 1993

[54] APPARATUS FOR BULKHEAD BUOYANCY AND PIPE DIFFERENTIAL PRESSURE

[76] Inventor: Dane R. Hancock, 516 Bontana Ave., Fort Lauderdale, Fla. 33301

[21] Appl. No.: 680,632

[22] Filed: Apr. 1, 1991

Related U.S. Application Data

[60] Continuation of Ser. No. 581,186, Sep. 10, 1990, abandoned, which is a continuation of Ser. No. 115,060, Oct. 29, 1987, abandoned, which is a continuation of Ser. No. 353,009, Mar. 1, 1982, abandoned, which is a division of Ser. No. 128,278, Mar. 7, 1980, Pat. No.

[51] Int. Cl.⁵ .............................. G01M 3/28
[52] U.S. Cl. ..................... 405/171; 405/158; 73/40.5 R; 73/49.1; 138/90
[58] Field of Search ............ 405/154, 158, 171; 73/40.5 R, 46, 49.1, 49.5, 49.8; 138/90; 285/93

[56] References Cited

U.S. PATENT DOCUMENTS

| | | | |
|---|---|---|---|
| 1,841,974 | 1/1932 | Naylor | 73/49.5 X |
| 2,526,172 | 10/1950 | Sunde | 73/49.5 X |
| 3,978,678 | 9/1976 | Duncan et al. | 405/171 |
| 4,011,620 | 3/1977 | Southgate | 405/171 |
| 4,344,319 | 8/1982 | Hancock et al. | 73/40.5 R |

Primary Examiner—Randolph A. Reese
Assistant Examiner—John A. Ricci
Attorney, Agent, or Firm—Malin, Haley, McHale, DiMaggio & Crosby

[57] ABSTRACT

A pipeline test bulkhead that can be neutrally buoyant under water for ease of transport under water is disclosed. The bulkhead is manually transportable under water without a crane regardless of the dry weight of the bulkhead out of the water and necessary for ease of transport under water in order to test each section of a pipe as it is attached during the construction of a pipeline under water.

3 Claims, 1 Drawing Sheet

APPARATUS FOR BULKHEAD BUOYANCY AND PIPE DIFFERENTIAL PRESSURE

This application is a continuation of U.S. application Ser. No. 07/581,186, filed Sep. 10, 1990, now abandoned, which is a continuation of U.S. application Ser. No. 07/115,060, filed Oct. 29, 1987, now abandoned, which is a continuation of U.S. application Ser. No. 06/353,009, filed Mar. 1, 1982, now abandoned, which is a division of U.S. application Ser. No. 06/128,278, filed Mar. 7, 1980, now issued as U.S. Pat. No. 4,344,319 on Aug. 17, 1982.

Methods for testing the sealing integrity of seals of joints being added to an underwater pipe string and of each previously laid joint in the pipe string each time a joint is added to the string, and means of controlling the buoyancy of a bulkhead and the finite differential pressure control between a submerged pipe and the surrounding water. The seal testing methods can be accomplished in two ways; dynamically, by pumping the sealed pipe until flow stops if the seal is perfect; or statically, by sealing the pumping unit discharge and measuring the pressure in the sealed pipe. The means of controlling the buoyancy of a bulkhead allows the bulkhead to be made buoyant at any given depth making it easier to move about underwater. The means of controlling the finite differential pressure between the inside of a submerged pipe and the surrounding water makes it possible to maintain a desired maximum differential pressure.

BACKGROUND OF THE INVENTION

Some of the greatest problems of laying pipe under water are making good seals between pipes in a string of pipe, testing the seals, and moving the bulkheads under the water. Also controlling the amount of pressure differential between the inside and outside of the pipe as not to exceed the design limits of the pipe. An improvement in the method of laying pipes under water is our U.S. Pat. No. 3,952,524, where the incompressability of water is used to help make better connections between adjacent pipes in a string of pipes. The present invention improves still further on that method by providing means to test just how good the joint seals are, easing the burden of moving the bulkhead under the water, and controlling the maximum pressure differential imposed on the pipe.

SUMMARY OF THE INVENTION

Methods for testing the sealing integrity of seals of joints between an underwater pipe string and pipes being added and of each previously laid joint in the pipe string and means of controlling the buoyancy of a bulkhead and the finite differential pressure between a submerged pipe and the surrounding water. The method of testing the integrity of the seals in the underwater pipe string can be accomplished dynamically by trying to pump out the pipe string which is sealed at the other end; if the seals are good, flow across the pump will be zero, but if a seal is bad, the flow across the pump will continue. This test can also be accomplished statically by placing a sealing plate across the pumping unit discharge to seal it. The pumping unit is then shut off and a vacuum gauge connected to the bulkhead interior is monitored. If the pressure differential does not change in a reasonable time, all the joints in the pipe line are good. If the pressure differential decreases, a joint or joints are not completely sealed. From this pressure change, the amount of leakage can be computed.

The means of controlling the buoyancy of the bulkhead consists of a hollow area in the bulkhead with an air inlet/outlet aperture and a water inlet/outlet aperture. The buoyancy of the bulkhead is controlled by adding more air or water, depending on the amount of buoyancy needed. When the bulkhead has the right buoyancy it can be moved about as if it were almost weightless, thus eliminating the need for a crane or other lifting device.

The means of finite differential pressure control comprises an aperture through the bulkhead with a compensated release door on one end, the release door can be preset to trip at any predetermined pressure to maintain a maximum pressure differential between the pipe interior and exterior. This differential may be positive or negative, depending upon orientation of the release mechanism.

An object of the present invention is to provide a method of testing the integrity of seals between pipes in a pipe string.

Another object of the present invention is to provide a means of controlling the buoyancy of a bulkhead to facilitate its movement underwater.

A further object of the present invention is to provide a means of maintaining a maximum positive or negative pressure differential between the inside and outside of a pipe.

In accordance with these and other objects which will be apparent hereinafter, the instant invention will now be described with particular reference to the accompanying drawings.

DESCRIPTION OF THE PREFERRED EMBODIMENT

Figure 1:
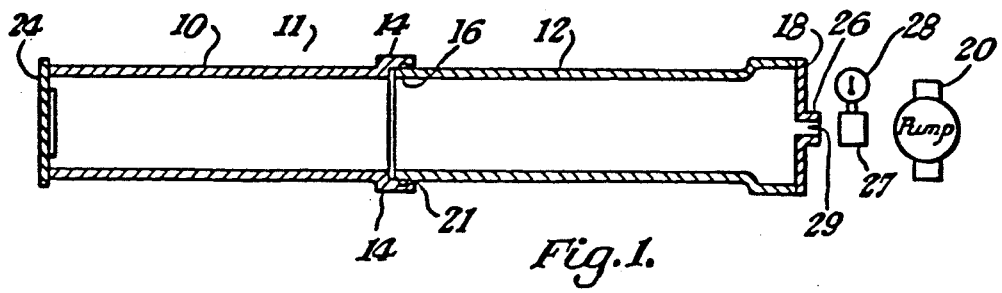
FIG. 1 is a cross-sectional side view of two joined and sealed pipes illustrating bulkheads.

Referring to FIG. 1, two pipes are shown after the joint and seal between them have been made. Pipe 10 has been connected to pipe 12 by means of the female end 14 of pipe 10 and the male end 16 of pipe 12. The other end of pipe 10 is sealed by bulkhead 24. Bulkhead 24 may be a solid one piece bulkhead. To determine if the seal of the joint between pipes 10 and 12 is good, the pump 20 is used to create a lower pressure in both pipes relative to the outside pressure of the water 11. The outside pressure is the water pressure on the pipe which is the pressure below the surface of the water. The pump 20 is connected to conduit 27 that is connected to opening 29 in bulkhead 18. The pump 20 moves water out through opening 29 in the bulkhead pipe 26. If the flow through opening 29 and the pump 20 as measured by flow-meter 28 connected to the opening in pipe 27 is zero after a reasonable time after the pump 20 is activated, the seal is good. If the flow continues, however, the seal is no good because matter such as water continues to come into the interior of the pipes through the joint between them, such as indicated by numeral 21.

Figure 2:
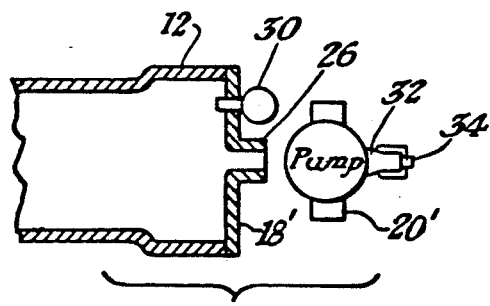
FIG. 2 is an enlarged view of the right bulkhead in FIG. 1 with a pumping unit.

Now referring to FIG. 2, showing pipe 12 with bulkhead 18' attached, another way of determining if the seal of the joint between the two pipes is good is by sealing the discharge 32 of the pump 20, after it is connected to bulkhead pipe and after it is run for a time period, with sealing plate 34 and shutting off the pumping unit and monitoring the vacuum gauge 30 which is connected to and through the bulkhead 18, to monitor the internal pressure. If the pressure differential does not change in a reasonable time, the seal is good. If the pressure differential decreases, the seal is not good. The testing procedure can be repeated each time a joint is added to the string of pipes on a line. Testing is independent of pipe line length or number of joints.

Figure 3:
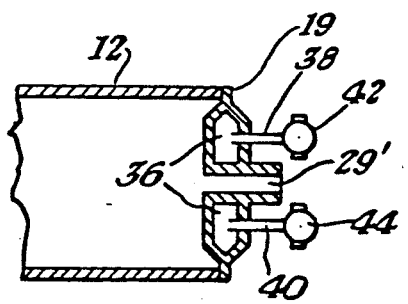
FIG. 3 illustrates another bulkhead in place of the bulkhead shown in FIG. 2.
Figure 4:
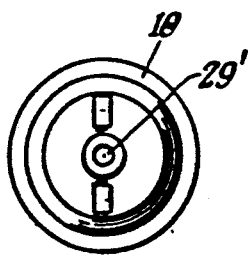
FIG. 4 is an end view of the bulkhead shown in FIG. 3.

Referring to FIGS. 3 and 4, the bulkhead 18 is shown with opening 29', annular area 19 and with a cavity 36 in it into which water can be added by valve 44 through opening 40. The water can also be drained out through opening 40. Air may be added in through hole 38 through valve 42 from air supply not shown. By controlling the amounts of air and water that are in chamber 36, the buoyancy of the bulkhead 18 can also be controlled. The right buoyancy can make bulkhead 18 very easy to move underwater since it will be virtually weightless. Such a bulkhead is an advantage when tests are performed and each additional length of pipe is connected to the string.

Figure 5:
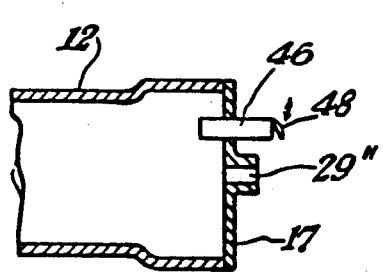
FIG. 5 is a cross-sectional side view of a bulkhead with pressure release door.
Figure 6:
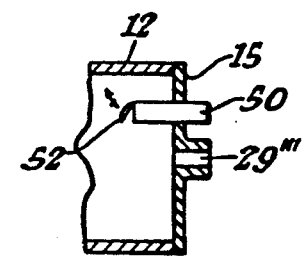
FIG. 6 is a cross-sectional side view of a bulkhead with another pressure release door.

Now referring to FIGS. 5 and 6, bulkheads 17 and 15 have openings 29" and 29''' respectively. Bulkheads 17 and 15 have an aperture through the bulkhead in pipes or conduits 46 and 50 respectively. The conduits have a pressure compensated release door 48 and 52 at one end. The differential may be positive or negative, depending on the orientation of the release mechanism. FIGS. 5 and 6 show two differential orientations of the release mechanism for providing automatic compensation for pressure in one direction or another.

The various items disclosed may be used in various combinations.

The instant invention has been shown and described herein in what is considered to be the most practical and preferred embodiment. It is recognized, however, that departures may be made therefrom within the scope of the invention and that obvious modifications will occur to a person skilled in the art.

What we claim is:

1. A pipeline test bulkhead that can be neutrally buoyant under water for ease of transport under water, said pipeline test bulkhead being employed for sealably closing the open end of an underwater pipe representing the termination of an underwater pipeline, said bulkhead being manually transportable under water without a crane regardless of the dry weight of the bulkhead out of the water and necessary for ease of transport under water in order to test each section of the pipe as it is attached during the construction of the pipeline under water comprising:

a rigid water impervious barrier, said barrier including an annular area for flush engagement with the open end of a pipe in a pipeline, said water impervious barrier having a first wall and a second substantially parallel wall spaced apart, with a sealed chamber formed between said first wall and said second wall;

first conduit means disposed through said first wall from outside said bulkhead terminating in said sealed chamber inside said bulkhead, said first conduit for adding or removing a buoyancy changing liquid such as water from said sealed chamber;

first valve means attached to said first conduit means for controlling the flow of buoyancy liquid through said first conduit means;

second conduit means disposed through said first wall from outside said bulkhead to said sealed chamber inside said bulkhead for adding a gas such as air to said chamber, said second conduit means being capable of being connected to a gas supply;

second valve means operably coupled to said second conduit for controlling the supply of gas through said second conduit means into said sealed chamber in said bulkhead, whereby said first valve means can be actuated to add or remove the buoyancy liquid into or from said sealed chamber in conjunction with the operation of said second valve means for supplying gas such as air to said sealed chamber such that the underwater buoyancy of said bulkhead can be adjustably selected to be neutrally buoyant to permit manual movement of said bulkhead under water without a crane.

2. A pipeline test bulkhead for use underwater and adjustable in buoyancy as in claim 1, including:

third conduit through said first wall and said second wall traversing and forming a channel through said bulkhead for use in pipeline sealing tests; and pump means for attachment to said third conduit means for performing said bulkhead test.

3. A pipeline test bulkhead as in claim 2, for use underwater with an underwater pipeline for testing sections of pipe, said bulkhead including:

a circular disc shape;

an annular area disposed around the perimeter of said circular disc shape of said bulkhead for engaging said open pipe end for performing sealable tests.

* * * * *